(12) United States Patent
Schexnayder et al.

(10) Patent No.: US 6,192,923 B1
(45) Date of Patent: Feb. 27, 2001

(54) ELECTROMAGNETIC FLOW CONTROL DEVICE

(76) Inventors: J. Rodney Schexnayder, General Delivery; Charles Lowe, 6215 Fausse Bayou Dr., both of Ventress, LA (US) 70783

( * ) Notice: Subject to any disclaimer, the term of this patent is extended or adjusted under 35 U.S.C. 154(b) by 0 days.

(21) Appl. No.: 09/020,719

(22) Filed: Feb. 9, 1998

Related U.S. Application Data

(63) Continuation-in-part of application No. 08/584,056, filed on Jan. 11, 1996, now Pat. No. 5,717,259.

(51) Int. Cl.[7] ................................................. F16K 31/02
(52) U.S. Cl. ..................... 137/487.5; 137/614.13; 137/614.21; 251/57; 251/129.1
(58) Field of Search ........................... 137/487.5, 614.21, 137/614.13; 251/57, 129.1, 59

(56) References Cited

U.S. PATENT DOCUMENTS

| | | | |
|---|---|---|---|
| 4,245,671 | * | 1/1981 | Kosugui .......................... 137/625.64 |
| 4,893,213 | | 1/1990 | Apostolides . |
| 5,717,259 | * | 2/1998 | Schexnayder .......................... 310/11 |

FOREIGN PATENT DOCUMENTS

| | | | |
|---|---|---|---|
| 1049652 | * | 8/1956 | (DE) ............................... 137/614.21 |
| 1197897 | * | 8/1970 | (GB) ................................. 137/487.5 |

* cited by examiner

*Primary Examiner*—Kevin Shaver
*Assistant Examiner*—John Bastianelli
(74) *Attorney, Agent, or Firm*—Kean, Miller

(57) ABSTRACT

An electromagnetic flow control device, or valve is provided. The valve uses two sets of stationary electromagnetic windings, with corresponding movable electromagnetic cores, which are completely contained within the flow stream of the valve. The movable cores are connected to a valve needle which can seal against a seat or open. The device is powered by electromagnetic energy only.

20 Claims, 6 Drawing Sheets

ELECTROMAGNETIC FLOW CONTROL DEVICE

CROSS-REFERENCE TO RELATED APPLICATION

This is a continuation-in-part of U.S. application Ser. No. 08/584,056 filed on Jan. 11, 1996, now U.S. Pat. No. 5,717,259.

The disclosure of the parent application, U.S. Ser. No. 08/584,056 is hereby incorporated by reference.

BACKGROUND OF THE INVENTION

1. Field of the Invention

This invention relates, generally, to devices for flow control, and particularly to flow control devices which can be remotely controlled.

2. Prior Art

Flow control devices are used in many industrial applications. Gate valves, ball valves, check valves, needle valves, and many other types of flow control devices are used in various industrial processes. A common configuration for a flow control device used in a industrial process is to have a flow control device located in a flow stream. The valve will include an actuator which is usually powered by compressed air.

The compressed air actuator on the valve will be activated by a control system which is electronically linked to a remote control station. This remote control station is usually a control room which monitors the process and controls the many flow control devices in the process.

There are two power systems necessary to run the conventional compressed air actuated valve. The first power system is the compressed air. Most petro-chemical facilities have a vast compressed air system running throughout the facility to supply compressed air to valve actuators and other equipment. The second power system is the electrical power system used for the electronic control system.

A disadvantage of compressed air actuators is that if power is lost to the actuator the valve will move to a default position, either open or closed. The inventors are not aware of actuator systems which leave the valve in the last known setting in the event that the compressed air supply is lost. Another disadvantage of compressed air actuators is that they require another piping infrastructure beyond the piping for the fluids used in the process.

Traditional control valves use a stem which traverses the casing of the valve. The section of the stem external to the valve is connected to the actuating mechanism. The section of the stem inside the valve is connected to a needle, ball, gate, disc, or some other structure which can be moved within the valve to control flow.

Regardless of the exact type of structure used in the control valve, a seal is used between the stem and casing. The goal of the seal (also known as packing) is to prevent leakage of the product in the pipe to the outside atmosphere. In applications involving negative pressure differentials, the seal prevents contamination of the product by the gases in the atmosphere.

There have been many advances in the field of flow control to improve seals. Improving the performance of seals is especially important in applications involving hazardous, corrosive, or toxic fluids. However, all of these advances in the seal do not change the basic configuration in which the stem is in contact with the product atmosphere, and moves (either vertically or by rotating) in relation to the casing.

What is needed is a flow control device which will eliminate the need for a seal between two moving parts so as prevent leakage of fluid to the atmosphere. What is also needed is a flow control device which does not require duplicate power systems. The flow control device should also be capable of remaining in the last known position if power to the flow control device is cut.

OBJECTS OF THE INVENTION

It is an object of the present invention to provide a flow control device which eliminates the need for seal between the valve stem and casing.

Another object of the present invention is to provide a flow control device which uses only one power source.

Another object of the present invention is to provide a flow control device which can operate without compressed air.

Another object of the present invention is to provide a device which will remain in the last set position if power to the device is cut.

SUMMARY OF THE INVENTION

An electromagnetic flow control device is provided. The flow control device includes a needle, a control system, a casing, and two electromagnetic machine sections which include windings and core sections. The electromagnetic machine sections are mirror images of each other. The machine sections and the needle are completely enclosed in the casing so that the fluid being controlled flows around the machine sections and the needle. In a preferred embodiment the machine sections and the needle have a channel filled with dampening fluid which flows from one machine section to the other as the needle moves.

An advantage of the electromagnetic flow control device is that there is no conventional valve stem which is exposed to both the fluid being controlled and the atmosphere.

A further advantage of the electromagnetic flow control device is that because there is no conventional valve stem, there is no need for a packing or sealing system to prevent leakage around the stem.

A further advantage of the electromagnetic flow control device is that it uses less power than valves which are actuated by a combination of compressed air with electronic control.

A feature of the flow control device is that it will remain in its last known setting even if power to the device is lost.

An additional feature of the flow control device is that it requires less maintenance than conventional valves.

An additional feature of the flow control device is that it eliminates the need for a compressed air piping system.

An additional feature of the flow control device is that it provides for smooth and accurate flow control.

These and other objects, advantages, and features of this invention will be apparent from the following descriptions of the invention.

BRIEF DESCRIPTION OF THE DRAWINGS

FIG. 2 shows the needle assembly of the invention in one of the closed positions.

FIG. 3A shows the needle assembly of the invention in the fully open position.

FIG. 4 shows the needle assembly of the invention in another of the closed positions.

DETAILED DESCRIPTION OF THE PREFERRED EMBODIMENTS

Figure 1:
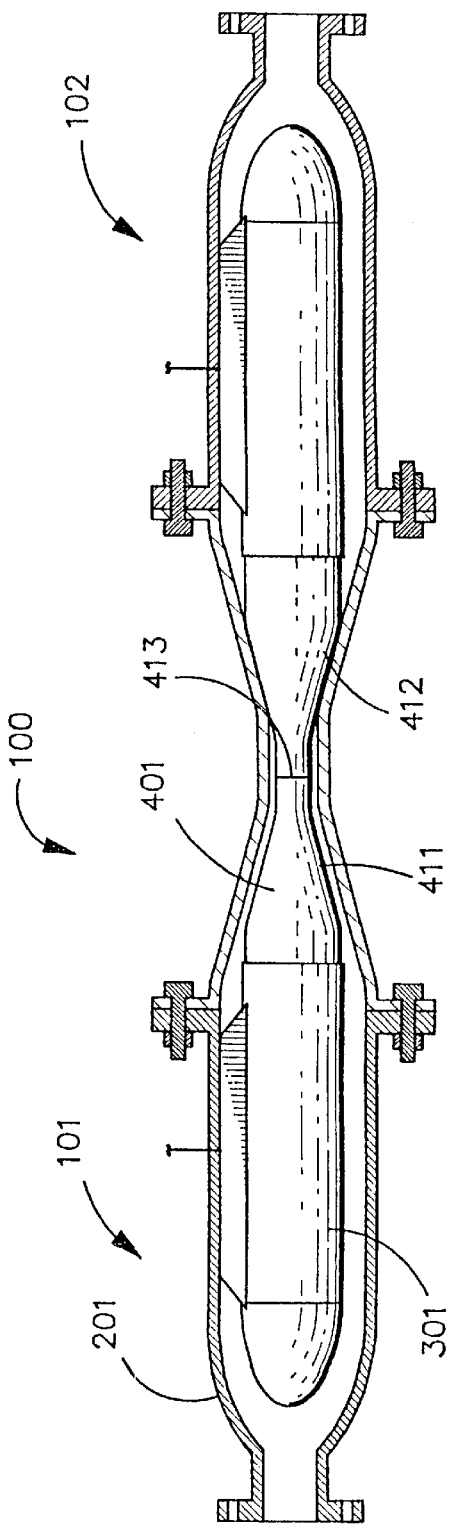
FIG. 1 is a combined view of a preferred embodiment of the invention. The casing is shown as a sectional view while the remainder of the invention is shown as an elevation view.
Figure 5:
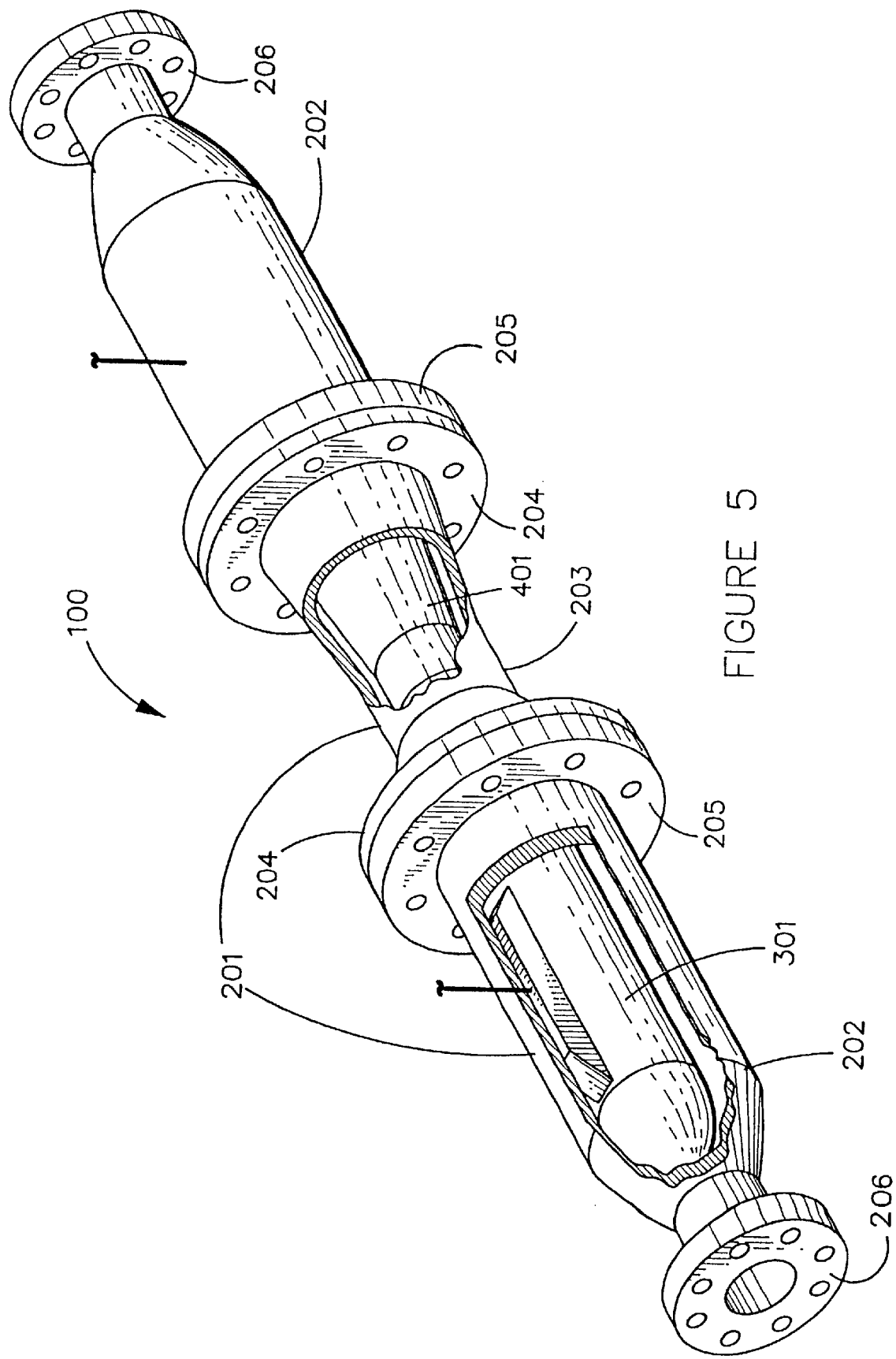
FIG. 5 is a perspective view of the invention. A portion of the casing has been cut away to show one motive assembly and the needle assembly.
Figure 7:
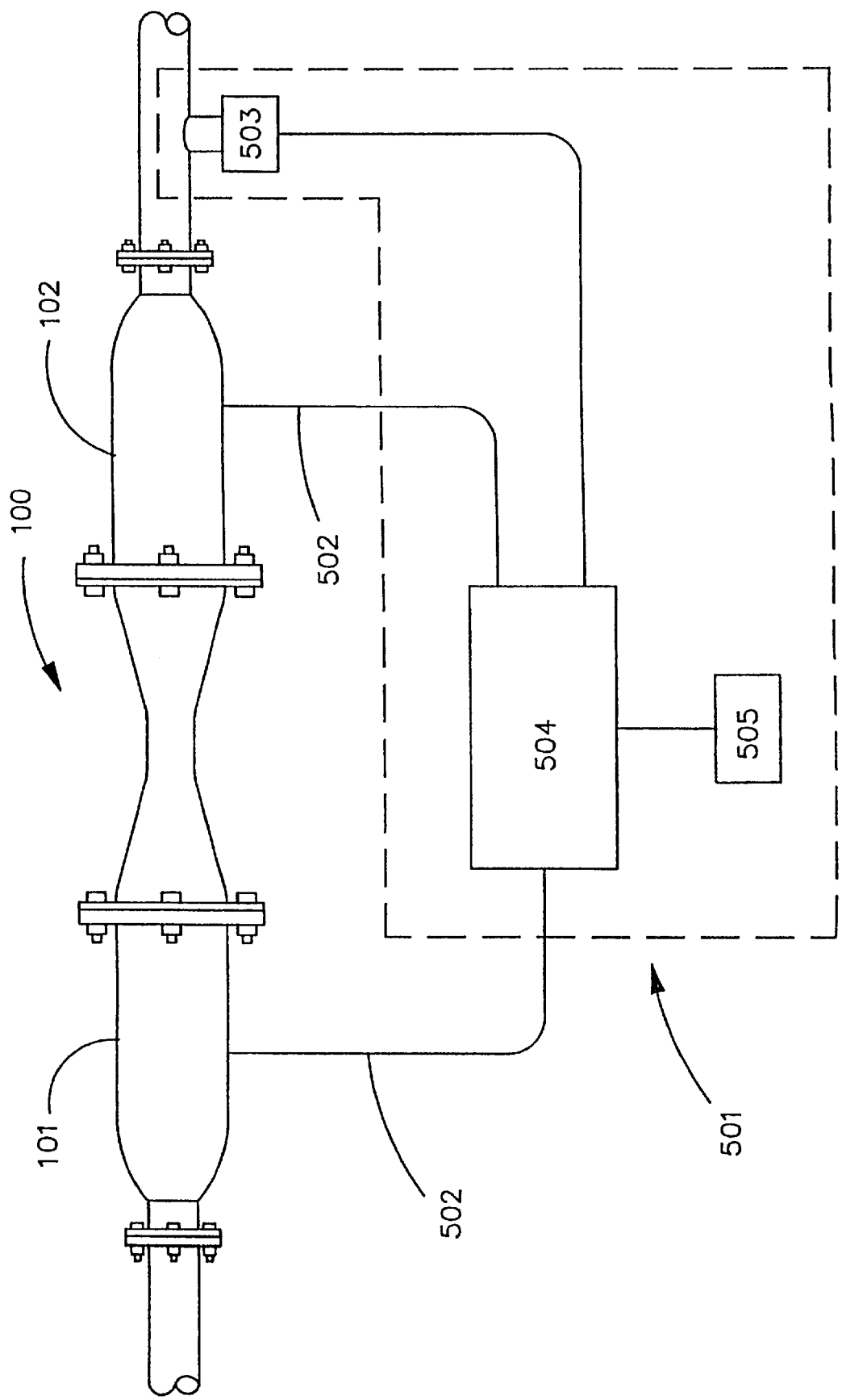
FIG. 7 is a plan view of the invention, to include the electronic control assembly.

With reference to FIGS. 1, 5, and 7 a preferred embodiment of electromagnetic flow control device 100 is shown. Flow control device 100 will include casing 201, motive assembly 301, needle assembly 401, and control assembly 501 (FIG. 7). In general, the following description lists only the parts contained in left half section 101 of flow control device 100. Right half section 102 will include the same parts and those parts will perform the same function as will be described below.

Figure 2:
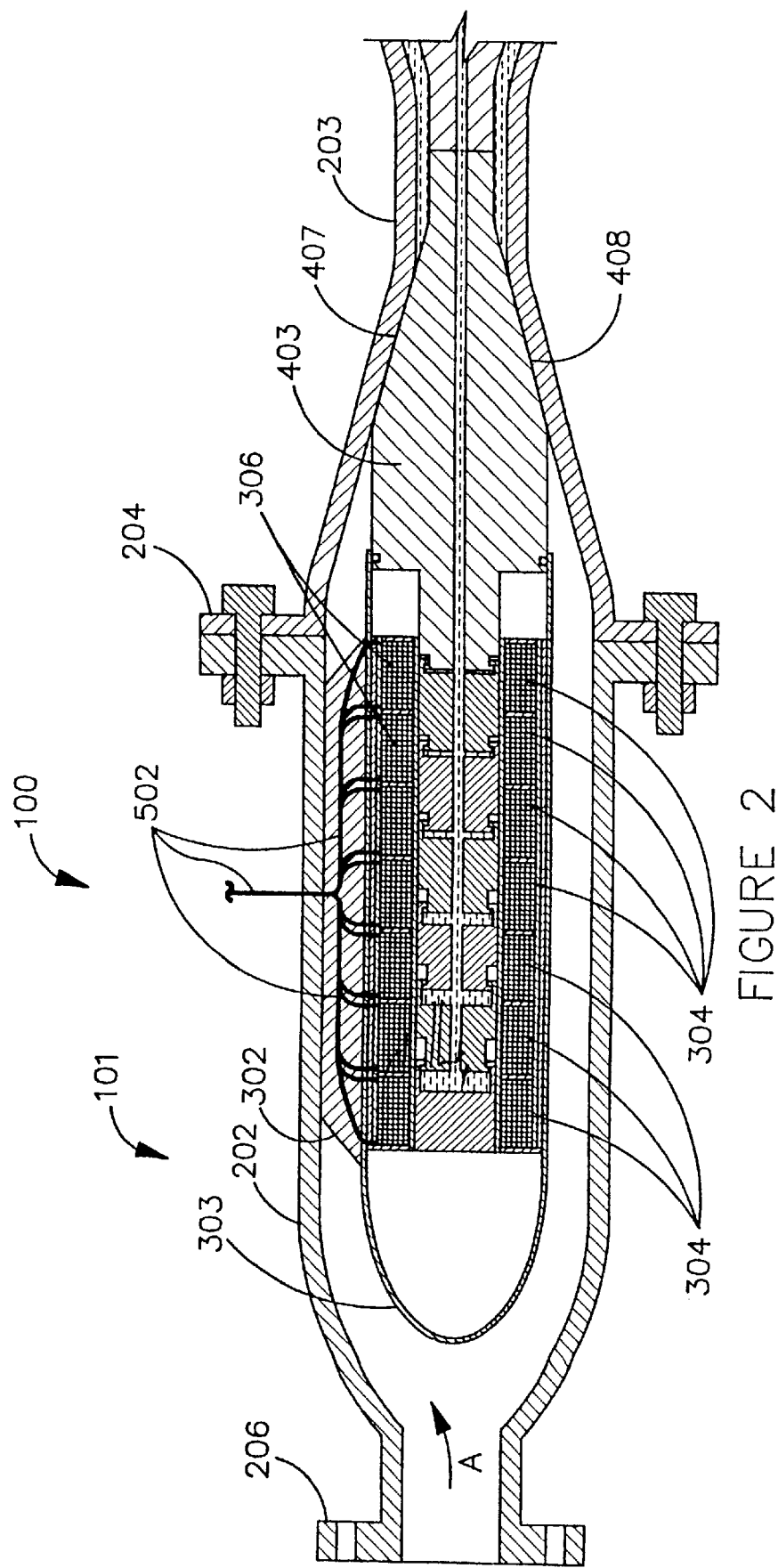
FIGS. 2, 3A, and 4 are sectional views of the left half section of the invention in various settings.
Figure 3:
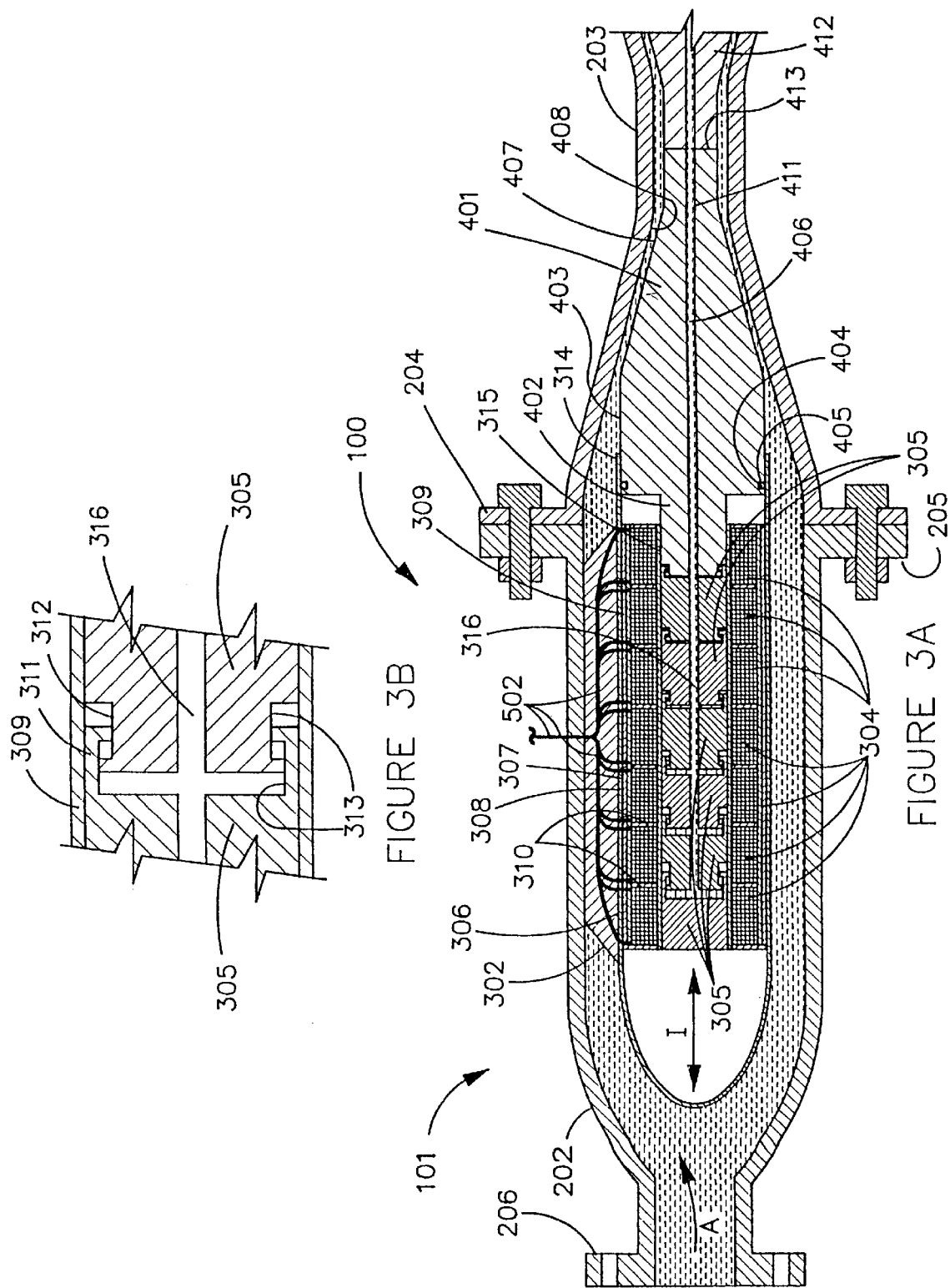
FIG. 3B shows is a sectional view of the core tube and core sections of the invention.
Figure 4:
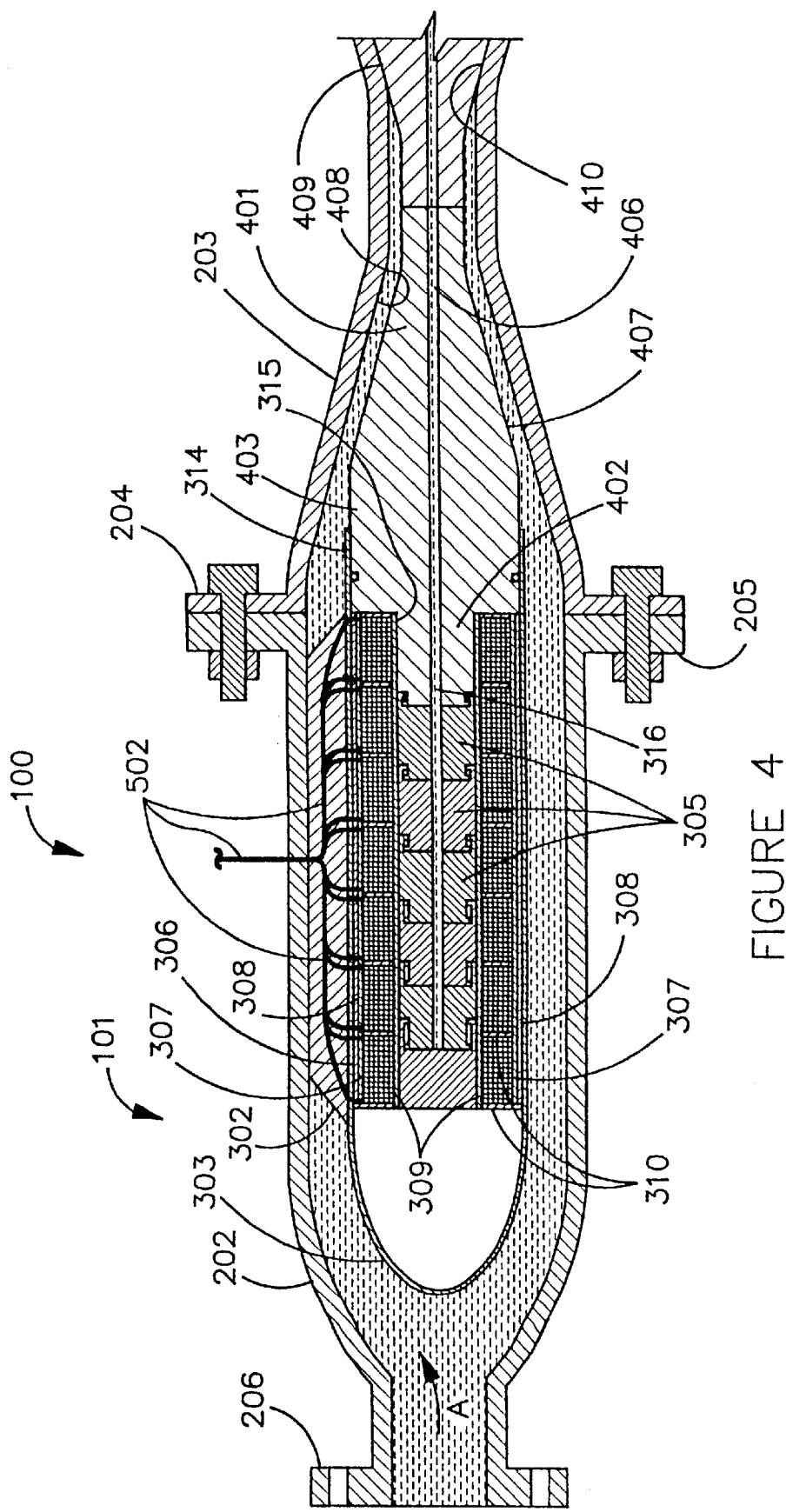

FIGS. 2 through 4 show flow control device 100 in various settings. In FIG. 2 needle assembly 401 is set in one of the closed positions. It is believed by the inventors that this closed position shown in FIG. 2 is the preferred closed position for flow in the direction of Arrow A.

FIG. 3A shows needle assembly 401 in a fully open position. FIG. 4 shows needle assembly 401 in a second fully closed position. It is believed by the inventors that the closed position shown in FIG. 4 is the preferred closed position for flow which is opposite the direction of Arrow A.

FIGS. 2 through 4 depict the following components of left half section 101 of flow control device 100. Outer casing 201 includes motive assembly casing 202 and needle assembly casing 203. Motive assembly casing 202 is connected to needle assembly casing 203 by the use of needle assembly casing flange 204 and motive assembly casing first flange 205. Motive assembly casing 202 is connected to the pipe in which flow control device 100 is installed by motive assembly casing second flange 205.

Motive assembly 301 is held in place in the flowstream in motive assembly casing 201 by strut 302. In one embodiment all sections of outer casing 201 are manufactured from stainless steel, as is strut 302. Preferably, strut is aerodynamically shaped so as to cause minimal disruption to the flow around motive assembly 301.

Preferably, strut 302 is hollow or has passages within it which allow control wires 502 to pass from motive assembly 301 to the outside environment without being exposed to the product within the flowstream. Alternatively, one could run control wires 502 outside of strut 302. Although only one strut 302 is shown, one could use a plurality of struts for extra stability.

Motive assembly 301 includes deflector cone 303, winding sections 304, and core sections 305. Deflector cone 303, while not required, is preferred so as to allow for the smooth flow of the product through flow control device 100. Deflector cone 303 is rigidly connected to winding sections 304. In the embodiment depicted, deflector cone 303 and winding sections 304 are integrated together within motive assembly shell 306. Preferably, motive assembly shell 306 will be made of stainless steel.

To help contain the magnetic flux of winding sections 306, they will preferably be surrounded not only by motive assembly shell 306, but also by shielding layers 307 and 308. Shielding layers 307, 308 can be manufactured of any material which has shielding characteristics. In a preferred embodiment an alloy with the following approximate proportions of elements is used: 80% nickel, 4.2% molybdenum, and the balance in iron. Such an alloy is available commercially from Carpenter Technology Corp. as "Carpenter HyMu 80®Alloy."

Winding sections 304 are consist of wire wrapped around core tube 309. Core tube 309 will be constructed of stainless steel or other metal with a permeability of as close to zero as possible. Molybdenum, copper, or any metal which is malleable, conducts electricity, and is heat resistant can be used for the wire in winding sections 304. Each pair of control wires 502 for each winding are routed from motive assembly 301 out of motive assembly casing 202 via strut 302. Each winding section 304 will be held in place and partitioned from the adjoining winding sections by winding partitions 310.

In the embodiment depicted there are seven winding sections 304. Those skilled in the art may want to vary the number of sections so as to have as few as two winding sections 304 or more than seven. Generally, the number of winding sections will be one less than the number of core sections 305. The reason for this difference in number is that tail core section 402 of needle assembly 401 will act as the endmost core section and will correspond to the endmost winding section 304.

Core sections 305 are cylindrical members made of a material with high permeability such as the molybdenum-nickel-iron alloy discussed above for shielding layers 307, 308. Core section 305 nearest deflector cone 303 is rigidly fixed to core tube 309 so as to remain stationary. The remaining core sections 305 are allowed to slide within core tube 309 along long axis I of motive assembly shell 306.

Core sections 305 are limited in their axial movement by core links which connect the core section to each other. As shown in FIG. 3B, each core section 305 will have female link 311 on the side towards needle assembly 401. Each core section 305, except for core section 305 nearest deflector cone 303, will also include male link 312. Each female link 311 and male link 312 will be integrated with or rigidly connected to its corresponding core section 305. Tail core section 402 will also have a male link 312 integrated with it or rigidly attached to it.

The length of gap surfaces 313 shall be chosen to match each male link 312 and its corresponding connected female link 311. In a preferred embodiment the length of gap surface 313 for core sections 305 nearest needle assembly 401 will be shorter than the length of gap surfaces 313 for core sections nearest deflector cone 303. Varying the length of gap surfaces 313 in this manner will allow finer control of the settings at which needle assembly may be placed, and in turn very fine control of the flow of fluid through flow control device 100.

Sealing section 403 of needle assembly 401 is sized so that it makes surface contact with the inner surface of core shell open end 314. In a preferred embodiment sealing section 403 will include ring seat 404 and o-ring 405. O-ring 404 may be made of any solid or resilient material which will provide a seal between fluid contained with motive assembly shell 306 and the fluid whose flow is being controlled.

In a preferred embodiment, the lengths of core sections 305, tail core section 402, gap surfaces 313, and core tube open end 315 are chosen so that when core sections 305 are in the fully contracted position (as shown in FIG. 4) core sections 305 and tail core section 402 will be substantially adjacent to each other and the end of sealing section 403 of needle assembly 401 will be substantially adjacent to the winding partition 310 nearest needle assembly 401.

Preferably, the lengths of core sections 305, tail core section 402, gap surfaces 313, and core tube open end 315 are also chosen so that when the core sections are in the fully expanded position (as shown in FIG. 2), a portion of tail core section 402 will remain within core tube open end 315 and a portion of sealing section 403 will remain within motive shell open end 314.

Each core section 305 includes core channel 316 and needle assembly 401 includes needle channel 406. In a preferred embodiment all of the channels are aligned with each other and centered in core sections 305 and needle assembly 401. Core channels 316 and needle channel 406 have a sufficient cross-section so that fluid contained within core tube 309 and motive shell open end 314 can move through the channels as the core sections 305 and needle assembly 401 move.

In a preferred embodiment core channels 316, needle channel 406, core tube 309, and motive shell open 314 contain a dampening fluid. This dampening fluid will dampen the movement of the needle assembly 401 and core sections 305 and allow smoother control over the positioning of needle assembly 401. In a preferred embodiment the dampening fluid will be hydraulic fluid. One could also simply allow air to serve as the dampening fluid. Alternatively, one could eliminate o-ring 405 and size sealing section 403 and motive shell open end 314 so that the fluid in the flow stream could enter into the channel and serve as the dampening fluid.

The spacing between core tube 309 and core sections 305 and tail core sections 402 can be designed so that dampening fluid can flow around those components. Alternatively, if one wanted a tighter fit between these components one could add radial channels (not shown). These radial channels would simply be holes placed in core sections placed perpendicular to core channels 316 and would allow dampening fluid to flow easier when core sections 305 moved.

In such an alternative embodiment it may be desirable to have an additional o-ring (not shown) placed between tail core section 402 and core tube 309. Those skilled in the art may want to place bleeder holes through links 311, 312 to allow for the easier movement of dampening fluid as core sections 305 are moved.

In the closed position shown in FIG. 2, left needle mating portion 407 is in contact with needle casing left mating portion 408 so as to form a seal. In the fully open position shown in FIG. 3A, the fluid is free to flow around needle assembly 401. In the second fully closed position shown in FIG. 4, right needle mating portion 409 is in contact with needle casing right mating portion 410.

For ease of assembly, left needle portion 411 and right needle portion 412 are manufactured separately and are then joined together at junction 413 to form the completed needle assembly 401. See FIG. 1.

It is preferred that the dampening fluid be a liquid because liquids are substantially non-compressible. With a liquid as the dampening fluid, every movement of core sections 305 in left half section 101 of flow control device 100 will cause a reversed but otherwise mirror image movement of core sections 305 in right half section 102.

FIG. 7 depicts the electronic control components which comprise control assembly 501. Control wires 502 from winding sections 304 are grouped together for left half section 101 and right half section 102 and are routed to processor 504. Flow sensor 503 can be any type of conventional sensor which detects the rate of flow just downstream or upstream of needle assembly 401. Although in the embodiment depicted sensor 503 is located on a section of pipe joined to flow control device 100 one could also locate sensor 503 on flow control device 100 itself.

Control assembly 501 is a closed-loop feedback system. The operator will enter the desired flow rate into input device 505. Input device 505 will send a corresponding desired flow rate signal to processor 501. Processor 504, upon receipt of the desire flow rate signal from input device 505, will route the proper amount of current through each of the control wires 502.

Sensor 503 will measure the rate at which the fluid being controlled is flowing through flow control device 100. Upon measuring the actual flow rate, sensor 503 will send a corresponding actual flow rate signal to processor 504. In some embodiments the signal will be amplified by an amplifier before being transmitted to processor 504. Processor 504 will compare the actual flow rate signal received from sensor 503 to the desired flow rate signal received from input device 505.

Preferably, control assembly 501 will use 9 volt DC power or some other type of DC power supply so that batteries can be used for backup power. In a particularly preferred embodiment, processor 504 will also include an oscillator which will pulse the DC signal to control wires 502. Pulsing will allow for additional power savings and prevent excess heat build-up.

Once current corresponding to a particular setting is flowed into winding sections 304 winding sections 304 will remain magnetized even when the current is stopped. This ability of the device to remain in the last known position after the power is removed is one of the advantages of the invention.

If the operator desires to completely de-energize windings sections 304 the operator will enter this request into input device 505. Processor 504, upon receipt of the appropriate signal from input device 505, will then cause a reverse polarity current to flow for only a very short period. This reverse polarity current will de-energize winding sections 304.

Figure 6:
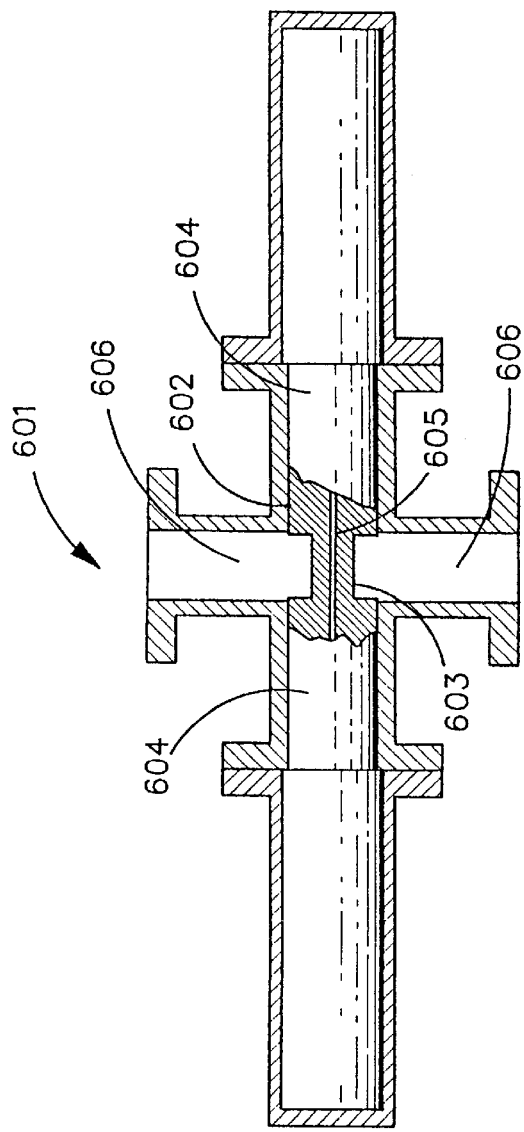
FIG. 6 is a combined view of the high-temperature embodiment of the invention.

FIG. 6 depicts an high temperature flow control device 601. This alternate embodiment can be used in applications in which the fluid to be controlled is at a high temperature. In general, if motive assembly 301 is completely immersed in the main current of a flow stream of high temperature fluid it will be more difficult to maintain and operate flow control device 100. High temperature flow control device 601 provides the advantages of the primary embodiment of FIG. 1 while protecting the motive assembly from the high temperature of the fluid being controlled.

The high temperature embodiment will still use motive assembly 301 (not shown). High-temp needle assembly 602 will include flow section 603 which has a smaller cross-section than plug sections 604 of high-temp needle assembly 602. As with the conventional embodiment, high-temp needle assembly 602 will include needle channel 605.

When high-temperature flow control device 601 is in the fully open position, flow section 603 will be aligned with transit openings 606. When high-temperature flow control device 601 is in the fully closed position, one of the two plug sections 604 will block the flow of any fluid through transit openings 606. One could also construct high-temperature device 601 so that the fluid could move around motive assembly 301. Because motive assemblies 301 would still be perpendicular to the main flow, they would be protected from the worst effects of the heat transfer from the fluid being controlled.

There are of course other alternate embodiments which are obvious from the foregoing descriptions of the invention, which are intended to be included within the scope of the invention, as defined by the following claims.

What is claimed is:

1. A flow control device comprising:
   (1) an outer casing having two motive assembly casings and a needle assembly casing;
   (2) two motive assemblies, each said motive assembly being wholly disposed within said corresponding motive assembly casing and within the flow stream of fluid flowing through said flow control device, each said motive assembly being attached to said motive assembly casing by at least one strut;
   (3) a needle assembly operably connected to each said motive assembly, said needle assembly and said motive assemblies being adapted such that each said motive assemblies direct the movement of said needle assembly, said needle assembly being adapted such that it can control the flow of fluid in said flow stream; and
   (4) an electronic control assembly for controlling said motive assemblies.

2. The device in claim 1 wherein each said motive assembly further comprises:
   (1) a plurality of core sections disposed within a core tube, the core section nearest said needle assembly being operably connected to said needle assembly; and
   (2) a plurality of winding sections disposed around core tube and disposed within each said motive assembly shell, each said winding section comprising a wire wrapped around said core tube.

3. The device in claim 2 wherein each said winding section includes a pair of control wires, and said control wires for each winding section are routed from said motive assembly out of motive assembly casing via said strut.

4. The device in claim 3 wherein:
   (1) said motive assembly further comprises a plurality of winding partitions adjacent to said winding sections, said winding partitions being substantially rigid members which hold said winding sections in place and partition said winding sections from adjoining winding sections; and
   (2) said winding sections are contained within at least one shielding layer, said shielding layer being of a material which has electromagnetic shielding characteristics.

5. The device in claim 4 wherein:
   (1) the number of winding sections is one greater than the number of core sections;
   (2) said motive assembly further comprises a deflector cone rigidly connected to said winding sections and said core tube at the end of said motive assembly which is furthest from said needle assembly; and
   (3) said deflector cone and said winding section are integrated together within a motive assembly shell.

6. The device in claim 5 wherein:
   (1) said core sections are cylindrical members made of a material with high permeability and said core section nearest deflector cone is rigidly fixed to said core tube;
   (2) said remaining core sections are slidably disposed within said core tube along the long axis of said motive assembly shell.

7. The device in claim 6 wherein:
   (1) said needle assembly further comprises two tail core sections which are rigidly connected to said needle assembly at each end; and
   (2) each said tail core section serves as the endmost core section and is at least partially slidably disposed within said core tube.

8. The device in claim 7 wherein:
   (1) each said core section includes a female link on the side toward said needle assembly and each said core section, except for the core section nearest said deflector cone, also includes a male link on the side toward said deflector cone;
   (2) each said tail core section of said needle assembly includes a male link; and
   (3) each said female link and each said male link is adapted to interconnect with each other in pairs such that said core sections and said tail core sections can slide within said core tube and are limited in their range of movement.

9. The device in claim 8 wherein:
   (1) each said female link and each said male link further comprise gap surfaces, said gap surfaces being of the same length for a particular pair of links; and
   (2) the length of said gap surfaces for the pairs of links nearest said needle assembly are shorter than the length of said gap surfaces for said pairs of links nearest said deflector cone.

10. The device in claim 9 wherein: said needle assembly further comprises a sealing section which is sized to make surface contact with the inner surface of the core shell open end.

11. The device in claim 10 wherein said sealing section further comprises a ring seat and an o-ring.

12. The device in claim 11 wherein the dimensions of said motive assembly shell, said core sections, said tail core sections, said gap surfaces, and the open end of said core tube are chosen so that:
   (1) when said core sections are in a fully contracted position said core sections and said tail core section will be substantially adjacent to each other and the end of said sealing section will be substantially adjacent to said winding partition nearest said needle assembly; and
   (2) when said core sections are in a fully expanded position a portion of said tail core section will remain within said core tube open end and a portion of sealing section will remain within said motive shell open end.

13. The device in claim 12 wherein each said core section includes a core channel and said needle assembly includes a needle channel, said core channel and said needle channel being aligned with each other and centered in said core sections and said needle assembly.

14. The device in claim 13 wherein said core channels, said needle channels, said core tube, and said motive shell open end contain a dampening fluid.

15. The device in claim 14 wherein said dampening fluid is hydraulic fluid.

16. The device in claim 15 wherein said needle assembly further comprises left and right needle mating portions and said needle casing further comprises needle casing left and right mating portions, said mating portions being adapted to form a seal when said mating portions are in a closed position.

17. The device in claim 16 wherein said electronic control assembly is a closed-loop feedback system and comprises:

(1) a processor connected to said control wires;

(2) a flow sensor connected to said processor and located so as to detect the actual flow rate through said flow control device and to send a corresponding actual flow rate signal to said processor;

(3) an input device connected to said processor, said input device being adapted such that a desired flow rate can be entered into said input device and said input device will send said processor a corresponding desired flow rate signal;

(4) said processor being adapted such that said processor will compare the actual flow rate to the desired flow rate signal and, if necessary, will modify the current supplied to said control wires by said processor.

18. The device in claim 17 wherein said electronic control assembly operates on pulsed DC power.

19. A flow control device comprising:

(1) an outer casing having a needle assembly casing;

(2) two motive assemblies;

(3) a high-temp needle assembly operably connected to each said motive assembly, each said high-temp needle assembly having a flow section in its middle portion and two plug sections located between two end sections on either side of said flow section, said flow section having has a smaller cross-section than said plug sections; and (4) a control assembly for controlling the electric current which is provided to said motive assemblies.

20. The device in claim 19 wherein said needle assembly includes a needle channel.

\* \* \* \* \*